US009288828B2

(12) United States Patent
Wu et al.

(10) Patent No.: US 9,288,828 B2
(45) Date of Patent: Mar. 15, 2016

(54) METHOD, APPARATUS AND SYSTEM FOR ACCESSING SERVICE BY MOBILE STATION

(71) Applicant: Huawei Technologies Co., Ltd., Shenzhen, Guangdong (CN)

(72) Inventors: Yijun Wu, Shenzhen (CN); Jun Wang, Shenzhen (CN); Haifeng Duan, Shenzhen (CN); Wei Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/668,830

(22) Filed: Nov. 5, 2012

(65) Prior Publication Data
US 2013/0058259 A1 Mar. 7, 2013

Related U.S. Application Data

(63) Continuation of application No. PCT/CN2010/079320, filed on Dec. 1, 2010.

(30) Foreign Application Priority Data

May 5, 2010 (CN) .......................... 2010 1 0165468

(51) Int. Cl.
*H04W 76/02* (2009.01)
*H04W 80/12* (2009.01)
*H04W 88/16* (2009.01)
(52) U.S. Cl.
CPC ............ *H04W 76/022* (2013.01); *H04W 80/12* (2013.01); *H04W 88/16* (2013.01)
(58) Field of Classification Search
USPC ......... 370/230, 259, 328, 329, 349, 351, 389, 370/401, 465; 709/224, 225; 713/189
See application file for complete search history.

(56) References Cited

U.S. PATENT DOCUMENTS 7,281,137 B1 * 10/2007 Vitikainen .................... 713/189
7,596,107 B1    9/2009 Andriantsiferana
(Continued)

FOREIGN PATENT DOCUMENTS

CN    1396744 A    2/2003
CN    1568050 A    1/2005
(Continued)

OTHER PUBLICATIONS

1st Office Action in corresponding Chinese Patent Application No. 201010165468.8 (May 2, 2013).
(Continued)

*Primary Examiner* — Edan Orgad
*Assistant Examiner* — Saumit Shah
(74) *Attorney, Agent, or Firm* — Leydig, Voit & Mayer, Ltd.

(57) ABSTRACT

A method, an apparatus, and a system for accessing service by a Mobile Station (MS) are provided by the present disclosure. The method comprises the following steps: Gateway General Packet Radio Service (GPRS) Support Node (GGSN) or a next level gateway of the GGSN receives a service request carrying Virtual Access Point Name (VAPN) or a service request not including APN transmitted from a MS, performs a Deep Packet Inspection (DPI) processing to the service request, and identifies the type of the service; GGSN or the gateway sends the service request to the external data network corresponding to the service type. Therefore, accessing various types of mobile data services can be achieved through the service identification function of GGSN or GGSN gateway without modifying MS APN configuration by the mobile MS, therefore the service experiences for a MS user is enhanced effectively.

10 Claims, 3 Drawing Sheets

(56) References Cited

U.S. PATENT DOCUMENTS

| | | |
|---|---|---|
| 2004/0087273 A1 | 5/2004 | Perttila et al. |
| 2005/0176438 A1 | 8/2005 | Li |
| 2009/0023426 A1 | 1/2009 | Shatzkamer et al. |
| 2009/0196255 A1 | 8/2009 | Gulbani et al. |
| 2009/0238192 A1* | 9/2009 | Dolganow et al. ............ 370/400 |
| 2009/0287811 A1* | 11/2009 | Juhasz et al. ................. 709/224 |
| 2010/0214929 A1* | 8/2010 | Ljung et al. ................... 370/241 |
| 2011/0131338 A1* | 6/2011 | Hu ................................ 709/229 |
| 2011/0246586 A1* | 10/2011 | Steele .......................... 709/206 |
| 2011/0264803 A1* | 10/2011 | Yuen et al. .................... 709/225 |

FOREIGN PATENT DOCUMENTS

| | | |
|---|---|---|
| CN | 1578487 A | 2/2005 |
| CN | 1744559 A | 3/2006 |
| CN | 101175283 A | 5/2008 |
| CN | 101287006 A | 10/2008 |
| RU | 2301506 C2 | 10/2003 |
| RU | 2381632 C2 | 2/2005 |
| WO | WO 2005071982 A1 | 8/2005 |
| WO | WO 2008079094 A1 | 7/2008 |
| WO | WO 2009/087120 A1 | 7/2009 |

OTHER PUBLICATIONS

Extended European Search Report in corresponding European Patent Application No. 10851013.2 (Jul. 25, 2013).

"3$^{rd}$ Generation Partnership Project; Technical Specification Group Core Network and Terminals; Numbering Addressing and Identification (Release 8)," 3GPP TS 23.003, V 8.8.0, Mar. 2010, 3GPP, Valbonne, France.

International Search Report in corresponding International Patent Application No. PCT/CN2010/079320 (Mar. 3, 2011).

Written Opinion of the International Searching Authority in corresponding International Patent Application No. PCT/CN2010/079320 (Mar. 3, 2011).

* cited by examiner

METHOD, APPARATUS AND SYSTEM FOR ACCESSING SERVICE BY MOBILE STATION

CROSS-REFERENCE TO RELATED APPLICATIONS

This application is a continuation of International Patent Application No PCT/CN2010/079320, filed on Dec. 1, 2010, which claims priority to Chinese Patent Application No. 201010165468.8, filed on May 5, 2010, both of which are hereby incorporated by reference in their entireties.

FIELD OF THE DISCLOSURE

The present disclosure relates to the field of mobile communications technology, and more particularly, relates to a method, an apparatus and a system for accessing service by a Mobile Station (MS).

DESCRIPTION OF THE RELATED ART

Currently, most of mobile internet based services are implemented by independent Access Point Name (APN), typically such as the two popular APNs of CMWAP (WAP access gateway) and CMNET (Internet access gateway) used by China Mobile as well as many other APN access points customized for group clients. CMWAP and CMNET are two General Packet Radio Service (GPRS) access manners factitiously divided by China Mobile. CMWAP is set up for cell phone to access network by WAP, while CMNET serves for PC, notebook computer, PAD or the like to access Internet using GPRS. CMWAP and CMNET have no difference in implementation manners but for different purposes. Thus, compared to CMNET, CMWAP has some limitations and different charges. In a simple way, CMWAP is equivalent to a local area network accessing Internet via a router and CMNET is equivalent to accessing Internet directly through a public network IP address.

FIG. 1 is a structural diagram showing a Mobile Station (MS) of the prior art accessing a service entity via a Gateway GPRS Support Node (GGSN), where users need to set different APNs at the MS and let service requests carry APNs. Then, GGSN sends these requests to different service entities based on different APNs, and thus various services are realized at the MS.

The technical solution of the current SGSN selecting APN and GGSN (APN activation) reads as follows:

01. Receiving a service request reported by the user;
02. Determining whether or not the APN in the service request is empty:
 021. If empty, then determining whether or not the user is a Home Local Register (HLR) contracted APN user:
 0211. If a contracted APN user, then further determining whether or not there is only a unique APN in the HLR: 02111. If only a unique APN, then querying a corresponding GGSN based on the unique APN; 02112. If more than two APNs in the HLR, then denying the activation;
 0212. If not a contracted APN user, then denying the activation.
 022. If not empty, determining whether or not the APN in the service request is a contracted APN:
 0221. If a contracted APN, then querying a corresponding GGSN based on the contracted APN;
 0222. If not a contracted APN, then denying the activation.

This solution avoids a scenario where service access failure occurs because the user only contracts with one APN but does not set the APN, but fails to avoid a scenario where service access failure occurs because the user has several contracted APNs but does not correctly set the APNs.

The processing flow of various services involved by multi APNs goes as follows:

[1] Accessing Enterprise Services

Configuring APN as an Enterprise APN at the MS and letting a service request car Enterprise APN, learning the Enterprise APN through analyzing the service request by GGSN, forwarding the service request to Virtual Private Network (VPN) router for processing, achieving access to enterprise services.

[2] Accessing Multimedia Messaging Service (MMS)

Configuring APN as a MMS APN at the MS and letting a service request carry the MMS APN, learning the MMS APN through analyzing the service request by GGSN, forwarding the service request to MMSC (Multimedia Messaging Service Centre) for processing.

[3] Accessing Wireless Application Protocol (WAP) Website

Configuring APN as a WAP APN at the MS and letting a service request carry the WAP APN, learning the WAP APN through analyzing the service request by GGSN, forwarding the service request to WAPGW for processing.

[4] Accessing Internet Website

Configuring APN as an Internet APN at the MS and letting a service request carry the Internet APN, learning the Internet APN through analyzing the service request by GGSN, forwarding the service request to Internet GW for processing.

During the research process, the present inventor has found that, the current MS can set only one APN configuration which causes the user to frequently modify MS configurations when the service being used is switched. For example, when the MS is receiving or sending multimedia messages, it is necessary to set the APN as CMWAP and meanwhile to set a correct WAPGW address, and then the MMS can be used; when the use wants to surf on net using high speed Internet, it is necessary to re-set the access point and delete Proxy settings. This hinders the popularization of various data services and degrades user's experience of services.

SUMMARY OF THE DISCLOSURE

The present disclosure provides a method, an apparatus, a system for accessing service by a MS, which can achieve an aim of accessing various APN services without frequently modifying APN by the MS.

Thus, the embodiments of the present disclosure may employ the following technical solutions:

A method for accessing service by a MS, comprising:
 receiving, a service request carrying Virtual Access Point Name (VAPN) or a service request not including Access Point Name (APN) transmitted from a MS, by Gateway GPRS Support Node (GGSN) or a next level gateway of the GGSN;
 performing a Deep Packet Inspection (DPI) processing to the service request, and identifying service type;
 sending, by the GGSN or the gateway the service request to an external data network corresponding to the service type.

An apparatus for accessing service by a MS, comprising:
 a receiving unit for receiving a service request carrying Virtual Access Point Name (VAPN) or a service request not including APN transmitted from a MS;
 a service type identifying unit for performing a Deep Packet Inspection (DPI) processing to the service request, and identifying service type;
 a control sending unit for sending the service request to an external data network corresponding to the service type.

A system for accessing service by a MS, comprising a MS, a gateway device and at least one APN function entity, wherein, the gateway device comprises:

a receiving unit for receiving a service request carrying Virtual Access Point Name (VAPN) or a service request not including APN transmitted from a MS;

a service type identifying unit for performing a Deep Packet Inspection (DPI) processing to the service request, and identifying service type;

a control sending unit for sending the service request to an external data network corresponding to the service type.

A MS, comprising:

a service requesting unit for sending a service request carrying Virtual Access Point Name (VAPN) or a service request not including APN to Gateway GPRS Support Node (GGSN) or a next level gateway of the GGSN and requesting a connection to an APN function entity;

a service processing unit for exchanging service data by an external data network that establishes a connection with the MS through the GGSN or the gateway.

Therefore, with the service identification function of GGSN or the next level gateway of GGSN, the embodiments of the present disclosure can achieve an goal that accesses various types of mobile data services without modifying MS APN configuration by the mobile MS, thereby realizing the access to various APN services with simplified user's operation, This effectively enhances the service experiences for a MS user and meanwhile promotes the service popularization for operators,

DESCRIPTION OF THE EMBODIMENTS

In the embodiments of the present disclosure, only one APN is configured at the MS and it is unnecessary to modify APN configuration at the MS when a user accesses different services.

Figure 2:
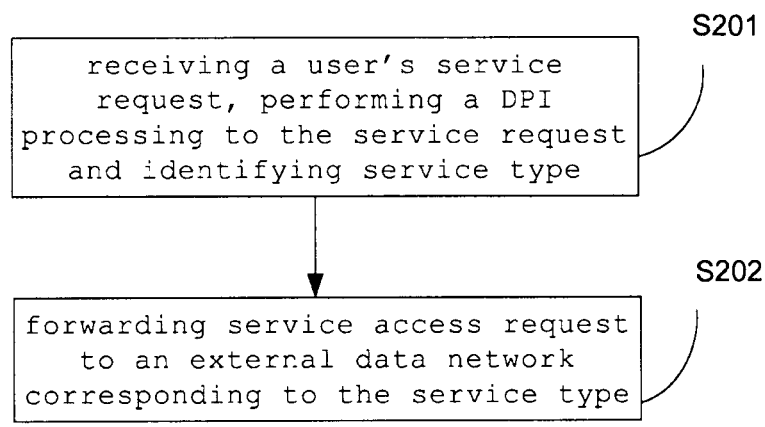
FIG. 2 is a flowchart of a method for accessing service by a MS according to the embodiments of the present disclosure.

FIG. 2 is a flowchart of a method for accessing service by a MS according to the embodiments of the present disclosure, which comprises:

S201: GGSN or a next level gateway of the GGSN receives a service request carrying VAPN (Virtual APN, Virtual VPN) or a service request not including APN transmitted by a user and identifies the type of the service by performing a DPI processing to the service request. The next level gateway of the GGSN can be called as a downstream gateway of the GGSN.

The VAPN is not an actual access point name or Proxy address, whose function mainly focuses on sending the request service to GGSN and meeting the demand of 3GPP specification or the like. For example, by configuring this VAPN at a user MS and contracting this VAPN on HLR, sending this service request without an actual access point or PROXY address to a corresponding GGSN can be achieved.

Of course, provided that a free pass strategy for the virtual APN stream or empty APN is configured on network devices, GGSN or its upstream gateway is able to receive the service request and identify service type by DPI.

S202: GGSN or the gateway forwards the service request to an external data network corresponding to the service type.

Compared with the solution of the prior art, the embodiments of the present disclosure identifies the service type at the side of core net equipment, forwards the service request to a corresponding external data network after identifying the service type, and finishes a corresponding APN service. At the MS side, only one VAPN is needed or no APN is set by appointment, and thus it is unnecessary to set any Proxy address or to manually switch between different APNs for different services.

Figure 1:
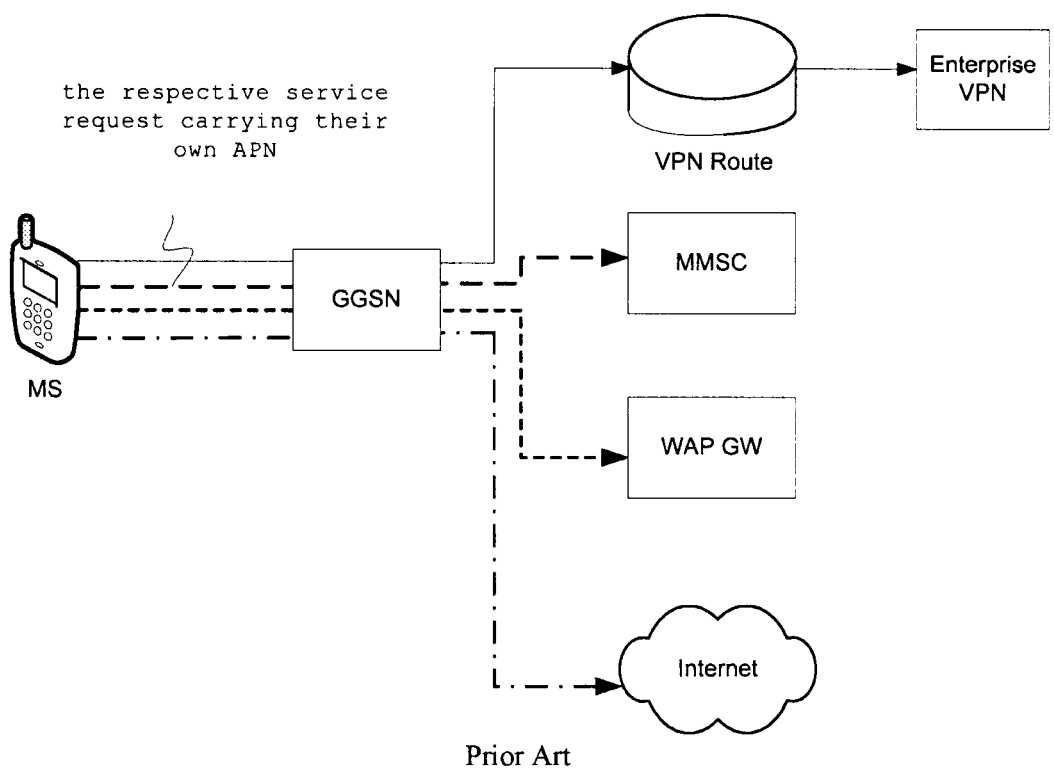
FIG. 1 is a diagram of a system for accessing service by a MS according to the prior art.

The solution of the prior art (see FIG. 1) mainly performs authentication and forwards message at GGSN. Specifically, a target function entity can be determined through APN carried by the service request and configured at the MS, and then the service request can be forwarded to the target function entity. Operations like message control are done on individual function entities. However, in the embodiments of the present disclosure, a GW is added at the next level of the GGSN for parsing and controlling the service request, i.e., for partial functions of the various function entities. Specifically; the service type is identified by data Deep Packet Inspection (DPI) instead of relying on the APN carried in the service request. Thus, it is unnecessary to configure the APN at MS side, simplifying MS configurations and operation of changing APN configuration.

Figure 3:
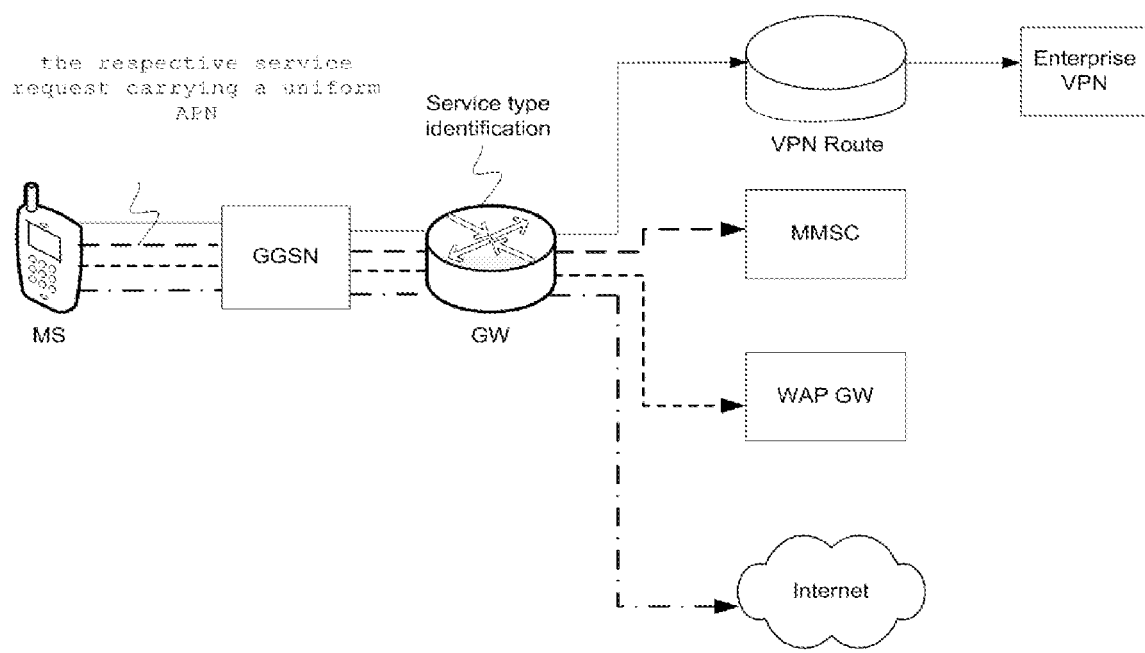
FIG. 3 is a diagram of a system for accessing service by a MS according to the embodiments of the present disclosure.

FIG. 3 is a diagram of a MS accessing service system according to the embodiments of the present disclosure. Compared with FIG. 1, FIG. 3 adds a gateway GW at the next level of GGSN. The main function of this GW is service identification. Further, this GW can achieve functions like Quality of Service (QoS) control or charge.

The GW of FIG. 3 performs a transparent processing to the received service request, i.e., not changing the message source address characteristics. The processing particularly goes as follows:

Before DPI, for a VPN service request of an enterprise user, after identifying the enterprise user is a specific contracted user through the enterprise user's IP, the VPN service request is forwarded to a specific routing platform (for example, a VPN router) to ensure the security of the service can be guaranteed.

For other types of service requests, corresponding processing is respectively performed as follows after obtaining service types by DPI:

2.1 for WAP1X request, forwarding to WAPGW for protocol conversion;

2.2 for MMS request, providing a head enhancement operation, adding at least some of user's PDP information (e.g. APN, MSISDN) to the head of the service request, and then sending the service request to MMSC;

2.3 for specific request (e.g. RTSP request, Real Time Streaming Protocol) requiring head enhancement, after adding a relevant head, sending the service request to a corresponding service function entity;

2.4 for common Internet service request, directly forwarding the service request to a corresponding service server.

DPI technology is an application layer based flow detection and control technology. When IP data packet, TCP or UDP data stream passes a DPI technology based bandwidth management system, the system reorganizes the application layer information in OSI reference model by reading in-depth the content of the IP packet load, thereby obtaining the content of the entire application, The system then reframes the flow in accordance with the management strategy defined by the system.

The step of DPI to obtain the service type can be, for example, a step in which DPI module reads out message content containing service information (e.g. MMS, WAP, HTTP, or the like) and further compares it with a local library to confirm the detailed service type information.

3. Processing for Abnormal Requests:

Compared with the solution of the prior art in which the respective service function entities respectively process their own services, the GW in the embodiments of the present disclosure is equivalent to a coordinator among the various service function entities and thus is capable of performing coordination and control for a certain abnormal request in the service entities. For example, for a WAP request having some setting errors (generally whose target server IP is a specific private net IP), the target IP is modified and then sent to WAPGW, for a responsive message, it is also necessary to modify source address, thereby ensuring a correct MS process.

4. Parsing Out Service Data Based on the Service Request, and Performing QoS Control or Charging Based on Service Data:

The QoS control and charging can be distributed on various function entities, for example, on MMSC or WAPGW. Since the existing GGSN cannot identify particular service data, it cannot perform different QoS control or charging for different services. In contrast, in the embodiments of the present disclosure, since GW has a service identifying function, the QoS control and charging can be assigned to this GW, instead of being distributed on the various service function entities. The solutions of the prior art can be also adopted in the present invention for implementation of the QoS control and charging, which is not a key point of the embodiment of the present disclosure.

Figure 4:
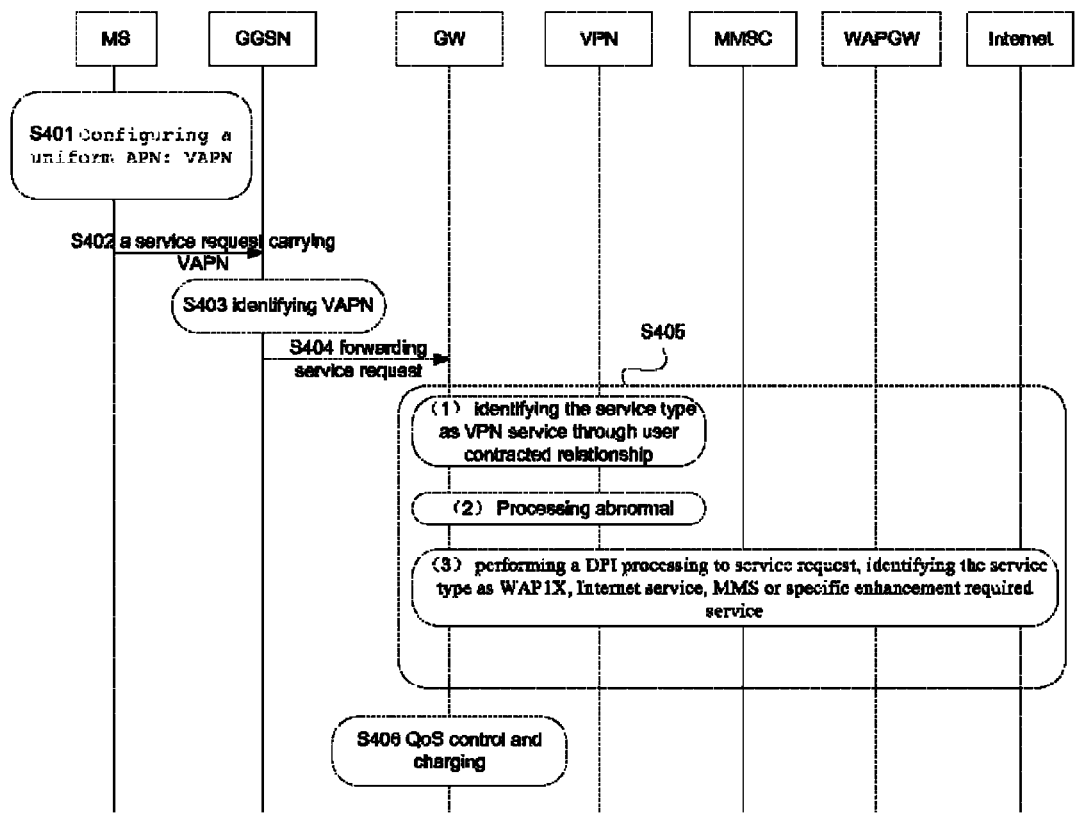
FIG. 4 is a flowchart of realizing service access by a MS through GW according to the embodiments of the present disclosure.

FIG. 4 is a flowchart of realizing service access by a MS through GW according to the embodiments of the present disclosure, in which, the following steps are included:

S401: for the APN service currently used by China Netcom, a virtual APN name (e.g. VAPN) is set at the MS, without the need to set any Proxy address. This VAPN can contain services involved by the following APNs, that is, the following APNs can be replaced:

Internet APN;
MMS APN;
WAP APN;
Enterprise User APN;

S402: the MS sends a service request to the GGSN and this service request carries a newly added VAPN;

S403: GGSN obtains a VAPN from the service request;

S404: since the service request contains VAPN, it can be known from this GGSN that virtual APN strategy is employed, and thus the service request is forwarded to GW;

Alternatively, step S401 can be omitted. That is, ANP is not configured at MS and the service request does not include APN. At this point, it is defaulted that the GW service identification strategy is employed, after the GGSN receives the service request and after the processing such as authentication in S404, the service request is directly forwarded to GW.

S405: GW identifies the particular service type based on service request and performs corresponding operations:

(1) Identifying the service type through the contract relationship with the user For example, the service type is identified as a VPN service through the contract relationship with the user. Then the VPN service request is forwarded to a corresponding virtual private network router (VPN Route).

(2) For abnormal service requests, controlling and processing the request in accordance with a preset strategy For example, when the abnormal service request is an incorrect WAP request, the target IP of the WAP request is modified, and then the request is sent to WAPGW.

(3) Identifying the service type by parsing the service request, specifically, performing DPI processing to the service request, identifying the service type as one of WAP1X, Internet service, MMS or specific enhancement requiring type service, and providing corresponding processing:

For WAP1X or Internet service, the service request is directly forwarded to WAPGW or Internet service server:

For MMS, the service request is subjected to a head enhancement operation and then is sent to MMSC;

For specific enhancement-required type service, the service request, after being added a message head, is sent to a corresponding service entity.

S406: performing QoS control and charging in accordance with the service data obtained by parsing the service request.

In addition, note that, the above solution adds a GW at the next level of the GGSN for achieving service type identification as well as QoS control and charging. Actually, it is also possible to not add this GW, but directly achieve these functions on the GGSN, that is, the same purpose also can be achieved by directly modifying the GGSN.

Corresponding to the above method, the embodiments of the present disclosure also provide an MS accessing service apparatus. Specifically, this apparatus can refer to GW at the next level of GGSN, or a function entity within GGSN, which can be implemented by software, hardware or a combination of software and hardware.

Figure 5:
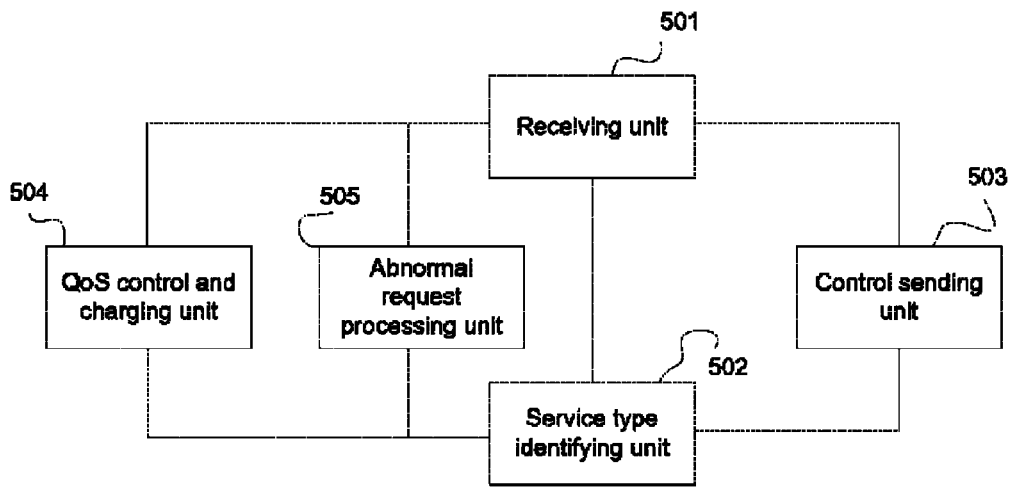
FIG. 5 is a diagram of a structure of a GW according to the embodiments of the present disclosure.

With reference to FIG. 5, this apparatus may comprise:

a receiving unit 501 for receiving a service request carrying VAPN or a service request not including APN transmitted from the MS user;

a service type identifying unit 502 for performing a DPI processing to the service request to identify the service type;

a control sending unit 503 for sending the service request to an APN function entity corresponding to the service type.

Wherein, the service type identifying unit 502 is also used for identifying VPN service through a contract relationship.

Optionally, this apparatus may comprises:

QoS control and charging unit 504 for parsing out service data based on the service request and performing QoS control and/or charging based on the service data.

Further, this apparatus may comprise:

an abnormal request processing unit 505 for controlling and processing an abnormal service request in accordance with a preset strategy, Wherein, the particular functions of the control sending unit 503 are as follows:

When the service type identifying unit 502 identifies the service type as VPN service, the service request is forwarded to a corresponding virtual private network router;

When the service type identifying unit 502 identifies the service type as WAP1X, Internet service, MMS or specific enhancement requiring type service:

For WAP1X or Internet service, the service request is directly forwarded to WAPGW or Internet service server;

For MMS, the service request is subjected to a head enhancement operation and is then sent to MMSC;

For specific enhancement requiring type service, the service request, after being added a message head, is sent to a corresponding service entity.

As for the particular implementation details of this apparatus, reference can be made to the method embodiments, and thus details thereof will be omitted.

Moreover, the embodiments of the present disclosure also provide an MS accessing service system. FIG. 3 shows the diagram of this system. Compared with the prior art, this system comprises a next level device GW of GGSN. As for the functions of this GW, reference can be made to FIG. 5 as well as descriptions thereof. In addition, the system provided by the embodiments of the present disclosure can have no GW added thereto but be directly realized on the GGSN with all of its functions.

Besides, the embodiments of the present disclosure also provide a user MS, which may comprise: a service requesting unit for sending a service request carrying a virtual access point name or a service request not including APN to GGSN or an upstream gateway of the GGSN and requesting a connection to APN function entity; a service processing unit for performing service data exchange by an external data network that establishes a connection through the GGSN or the upstream gateway of GGSN.

It can be seen that, in the embodiments of the present disclosure, with the service identification function of GGSN or the upstream gateway of GGSN, the embodiments of the present disclosure can achieve an aim of accessing various types of mobile data services without modifying MS APN configuration by the mobile MS, thereby realizing the access of various APN services on a basis of simplified user's operation, effectively enhancing the service experiences for a MS user, and meanwhile promoting the service popularization for operators.

One of ordinary skill in the art can understand that, the procedure for realizing the method of the above embodiments can be completed by a hardware related to program instructions, the program can be stored in a readable storage medium and perform the corresponding steps of the above method when being executed. The storage medium can be ROM/RAM, magnetic disc or optical disc.

The preferred embodiments of the present disclosure have been described above. It should be pointed out that, one of ordinary skill in the art can make various modifications and improvements to these embodiments without departing from the principle of the present disclosure, and these modifications and improvements also should be considered as within the claimed scope of the present disclosure.

What is claimed is:

1. A method for accessing service by a Mobile Station (MS), comprising:
receiving, a service request carrying Virtual Access Point Name (VAPN) which is not an actual access point name or a service request including an empty Access Point Name (APN) transmitted from the MS, by Gateway GPRS Support Node (GGSN) or a next level gateway of the GGSN, wherein the GGSN is configured with a free pass strategy for the VAPN or the empty APN to receive the service request;
identifying a Virtual Private Network (VPN) service through a contracted relationship, and forwarding the VPN service to a corresponding routing platform;
performing a Deep Packet Inspection (DPI) processing to the received service request to identify a service type if no VPN service is identified;
sending, by the GGSN or the next level gateway, the received service request to an external data network according to the service type identified by the DPI processing.

2. The method of claim 1, further comprising:
parsing out service data based on the received service request;
performing at least one of (a) quality of service (QoS) control and (b) charging based on the service data.

3. The method of claim 1, further comprising:
controlling and processing an abnormal service request in accordance with a preset strategy.

4. The method of claim 3, wherein,
when the abnormal service request is an incorrect wireless application protocol (WAP) request, controlling and processing the abnormal service request in accordance with a preset strategy comprises: modifying a target IP of the incorrect WAP request and sending the modified WAP request to a WAP gateway (WAPGW).

5. The method of claim 4, wherein,
the service type comprises one of the group consisting of WAP1X, Internet service, Multimedia Messaging Service (MMS), and specific enhancement requiring type service;
sending the received service request to the external data network corresponding to the service type comprises:
if the service type is the WAP1X or the Internet service, directly forwarding the received service request to the WAPGW or an Internet service server;
if the service type is the MMS, performing a head enhancement operation to the received service request and then sending the received service request to a multimedia messaging service centre (MMSC);
if the service type is the specific enhancement-required type service, adding a message head to the received service request and then sending the received service request with a message head to a corresponding service entity.

6. An apparatus for accessing service by a Mobile Station (MS), comprising a processor and a non-transitory processor-readable medium having processor-executable instructions stored thereon, the processor-executable instructions including a plurality of units, the units including:
a receiving unit configured to receive a service request carrying Virtual Access Point Name (VAPN) which is not an actual access point name or a service request including an empty Access Point Name (APN) transmitted from the MS;
a service type identifying unit configured to identify Virtual Point Name (VPN) service through a contracted relationship and to perform a Deep Packet Inspection (DPI) processing to the received service request to identify a service type if no VPN service is identified; and
a control sending unit configured to send the received service request to an external data network according to the service type identified by the processor;
wherein the processor is configured with a free pass strategy for the VAPN or the empty APN to receive the service request.

7. The apparatus of claim 6 further comprising:
quality of service (QoS) control and charging unit configured to parse out service data based on the received service request and performing at least one of (a) QoS control and (b) charging based on the service data.

8. The apparatus of claim 6 further comprising:
an abnormal request processing unit configured to control and process an abnormal service request in accordance with a preset strategy.

9. The apparatus of claim 6 wherein
when the service type identifying unit identifies the service type as Virtual Point Name (VPN) service, the control sending unit is configured to forward the received service request to a corresponding virtual private network router;
when the service type identifying unit identifies the service type as one of the group consisting of WAP1X, Internet service, Multimedia Messaging Service (MMS) or specific enhancement required service:
if the service type is the WAP1X or the Internet service, the control sending unit is configured to directly forward the received service request to Wireless Application Protocol (WAP) access gateway (WAPGW) or an Internet service server;
if the service type is the MMS, the control sending unit is configured to perform a head enhancement operation to the received service request and then sending the received service request to a multimedia messaging service centre (MMSC);
if the service type is the specific enhancement required type service, the control sending unit is configured to add a message head to the received service request and then sending the received service request with the message head to a corresponding service entity.

10. A Mobile Station (MS), comprising a processor and a non-transitory processor-readable medium having processor-executable instructions stored thereon, the processor-executable instructions including a plurality of units, the units including:
a service requesting unit configured to send a service request carrying Virtual Access Point Name (VAPN) which is not an actual access point name or a service request including an empty Access Point Name (APN) to Gateway GPRS Support Node (GGSN) or a next level gateway of the GGSN and requesting a connection to an APN function entity;
a service processing unit configured to exchange service data by an external data network that establishes the connection with the MS through the GGSN or the next level gateway according to a service type of the service request identified by a Deep Packet Inspection (DPI) processing in the GGSN or the gateway if no Virtual Private Network (VPN) service is identified, wherein the VPN service is identified by the GGSN or the next level gateway through a contracted relationship;
wherein the processor is configured with a free pass strategy for the VAPN or the empty APN to receive the service request.

* * * * *